United States Patent [19]
Dunham

[11] Patent Number: 5,538,303
[45] Date of Patent: Jul. 23, 1996

[54] SNAP HOOK WITH TETHER RELEASE

[76] Inventor: Billy Dunham, 12450 NE. 130th Ct. #F 302, Kirkland, Wash. 98034

[21] Appl. No.: 180,714

[22] Filed: Jan. 11, 1994

[51] Int. Cl.$^6$ ........................................ B66C 1/36
[52] U.S. Cl. .................. 294/82.31; 24/599.1; 24/599.8; 294/82.19
[58] Field of Search ................. 24/599.1, 599.4, 24/599.6, 599.7, 599.8; 114/221 R, 230; 294/82.19, 82.2, 82.21, 82.31, 82.33, 82.34

[56] References Cited

U.S. PATENT DOCUMENTS

| | | |
|---|---|---|
| 103,687 | 5/1870 | Thompson . |
| 653,021 | 7/1900 | Hamilton . |
| 1,524,761 | 2/1925 | Timbs ........................ 294/82.19 |
| 2,185,703 | 1/1940 | Doane ........................ 24/599.6 |
| 2,203,433 | 6/1940 | Gundian . |
| 2,313,802 | 3/1943 | Carlsen . |
| 2,347,718 | 5/1944 | Terry . |
| 2,418,111 | 4/1947 | Dahlander ................... 294/82.31 |
| 2,432,125 | 12/1947 | Schlaak . |
| 2,432,342 | 12/1947 | Shaiver . |
| 2,616,203 | 11/1952 | Sarakas . |
| 2,633,333 | 3/1953 | Storm . |
| 3,167,346 | 1/1965 | Miller . |
| 3,193,318 | 7/1965 | Guerrant, Jr. . |
| 3,653,101 | 4/1972 | Mayo . |
| 4,193,627 | 3/1980 | Cranston et al. . |
| 4,195,872 | 4/1980 | Skaalen et al. . |
| 4,751,892 | 6/1988 | Sechel et al. . |

FOREIGN PATENT DOCUMENTS

| | | | |
|---|---|---|---|
| 1104012 | 11/1955 | France | 294/82.19 |
| 1245538 | 7/1986 | U.S.S.R. | 294/82.19 |

*Primary Examiner*—James R. Brittain
*Attorney, Agent, or Firm*—Paul L. Griffiths

[57] ABSTRACT

A snap hook (H) is adapted to be connected to a ring eye (RE). Snap hook (H) includes a hook eye (HE) at its base end (14). A hook line (L) is connected to the hook eye (HE). Hook (H) includes a shank (20) which extends from the base (14) to a bight (22). The tine (24) is connected to and extends from the bight (22). A spring (40) normally biases a snap finger (36) into a hook throat closing position against the tine end (28). A tether (44) is connected to the snap finger (36). Tether (44) extends over the free end (42) of snap finger (36) to and through a tether guide (G) formed in or provided on the hook shank (20). The location of the tether guide (G) and the location of the tether (44) over the end (42) of the snap finger (36) establishes a pull line (PL). This pull line (PL) forms an acute angle (X) with the inner surface (26) of the hook tine (24). This acute angle (X) is between about thirty degrees and about forty degrees, with about forty degrees being preferred. Several ways of forming the tether guide (G) are disclosed. Several forms of the tether (T) are disclosed.

7 Claims, 3 Drawing Sheets

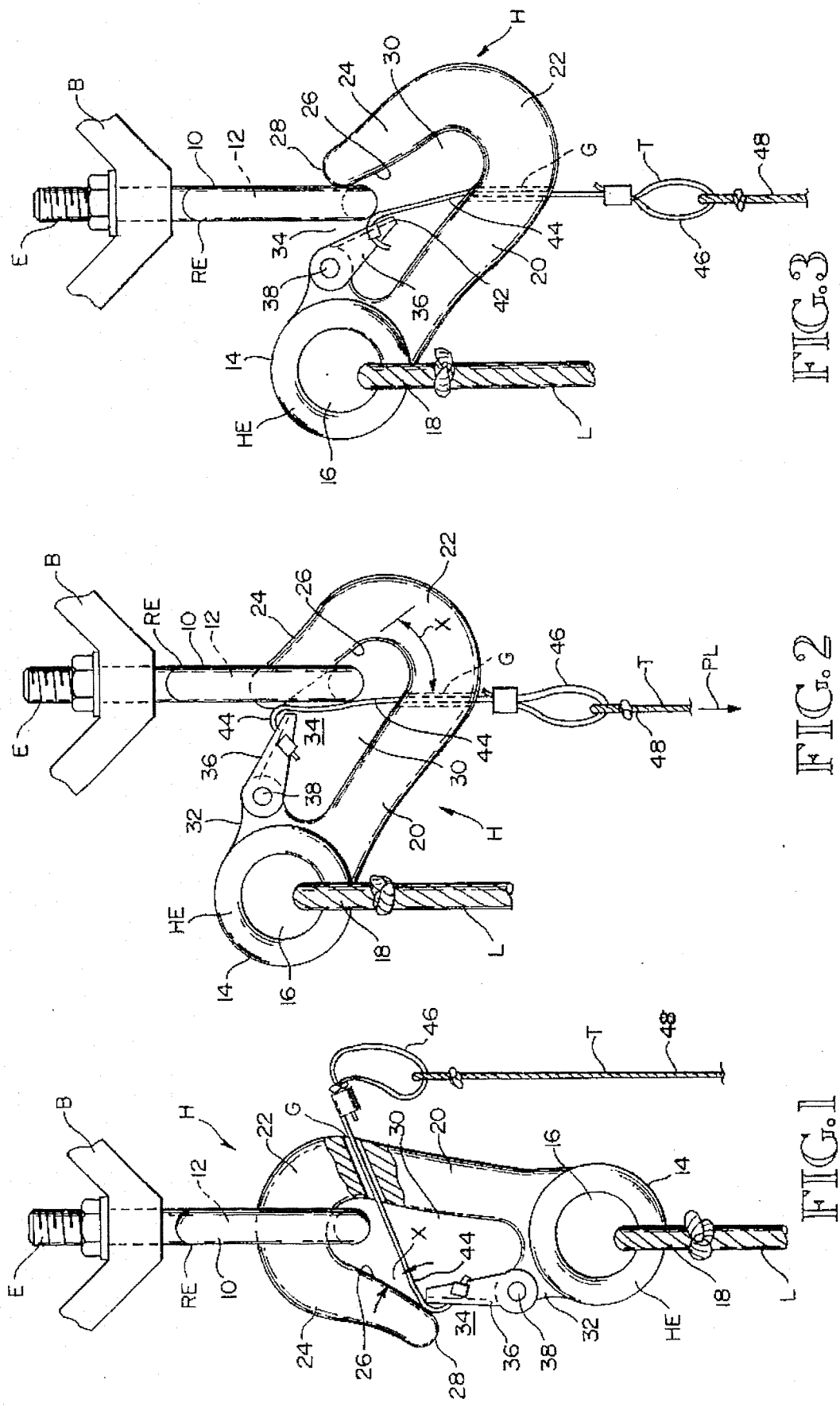

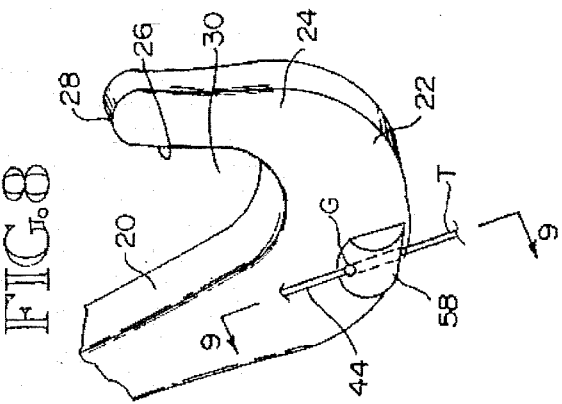
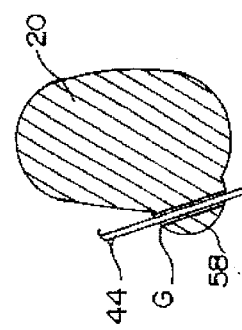
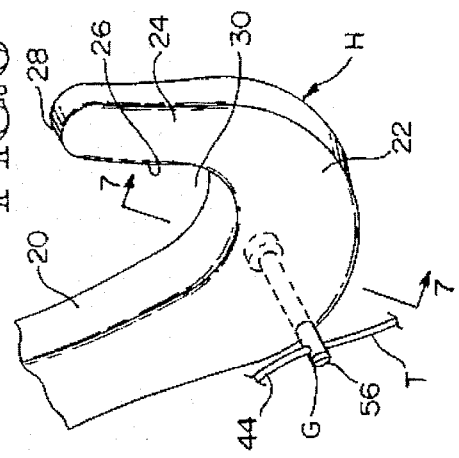
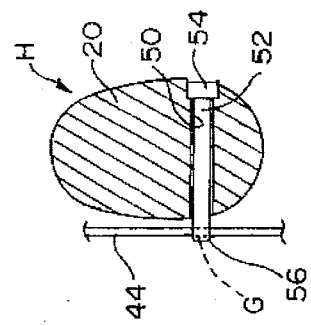
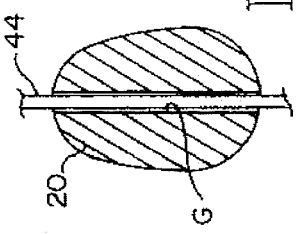
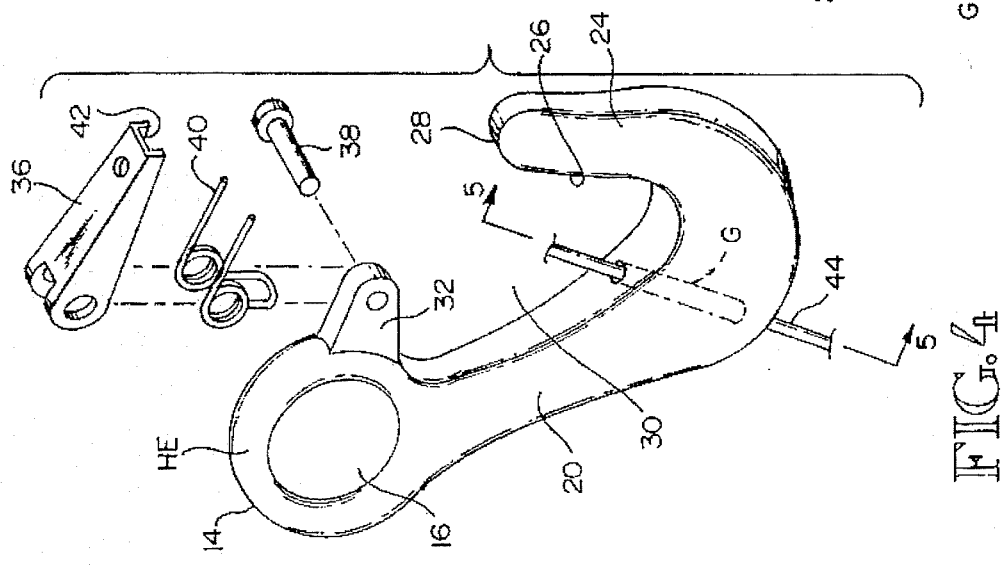

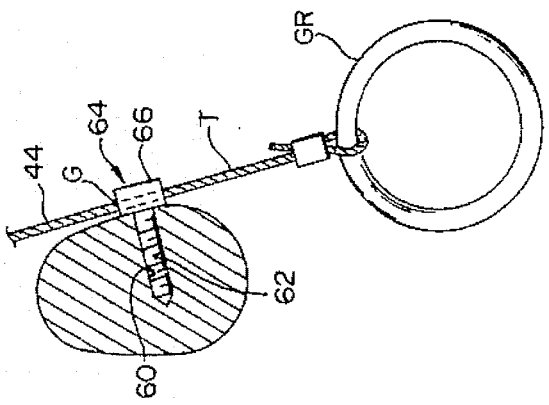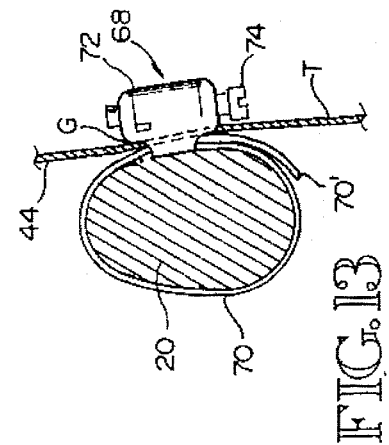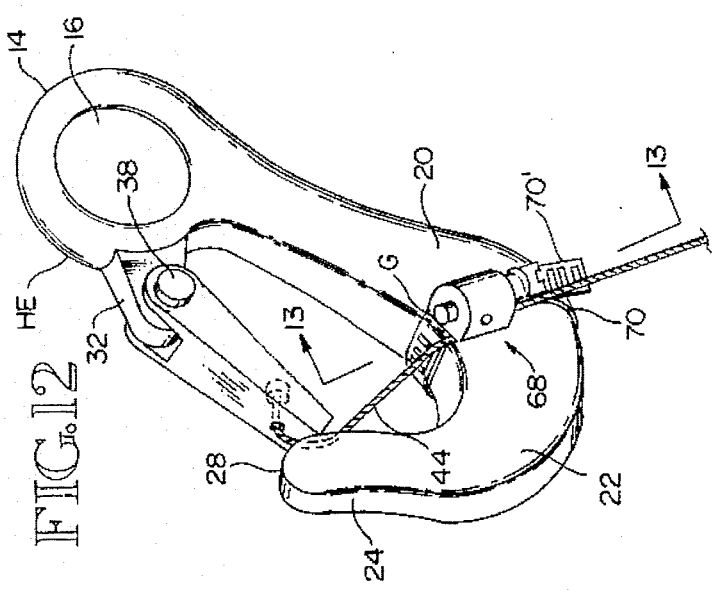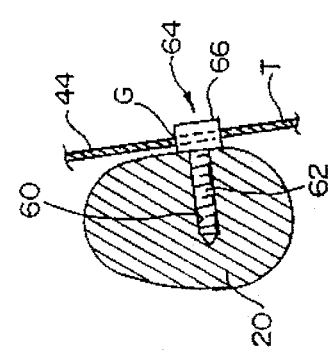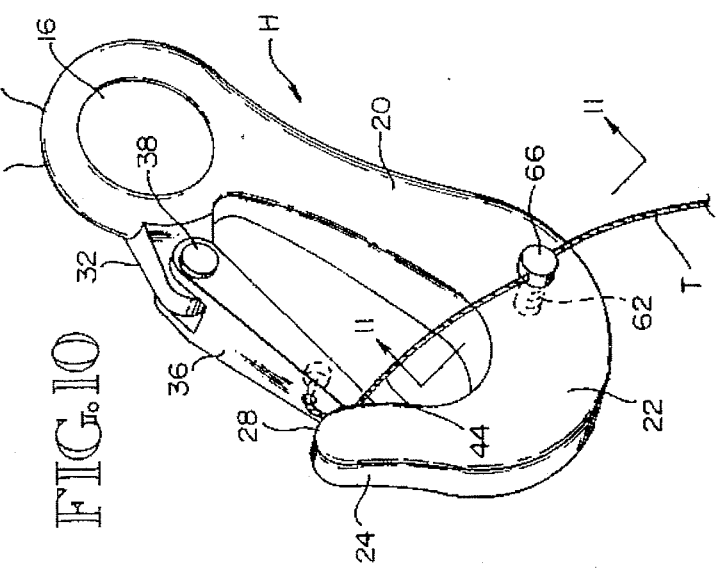

SNAP HOOK WITH TETHER RELEASE

TECHNICAL FIELD

This invention relates to snap hooks of a type which are connected to the end of a hook line and are used to engage an eye on the bow of a boat, buoy, a dock, or the like, and which include a tether release.

BACKGROUND INFORMATION

A snap hook is a hook which comprises a hook body having a base end which includes a hook eye or other connector for connecting it to a hook line. An elongated shank extends from the hook eye to a bight. The bight is connected to a tine. The hook eye, the shank, the bight and the tine together form a hook opening. The tine end and the hook eye together define a hook throat providing an avenue into and out from the hook opening. A snap finger is pivotally connected to the base end of the hook body and a spring is provided for biasing the snap hook into a hook throat closing position against the tine end. The snap finger is movable away from the tine end, against the spring force, into a hook throat opening position.

It is known to provide a snap hook of this type with a release tether that is used to pull the snap finger into a throat opening position. Examples of prior art snap fingers with a tether release feature, existing in the patent literature, are shown by U.S. Pat. No. 4,193,627, granted Mar. 18, 1980 to Albert W. Cranston and William J. Rowell; U.S. Pat. No. 4,195,872, granted Apr. 1, 1980 to Clifford I. Skaalen and Phillip M. Kling; and U.S. Pat. No. 4,751,892, granted Jun. 21, 1988 to David Sechel, Dennis DeTillio and Alan Szucs. Each of these patents shown a release tether that is connected to the snap finger and extends through an opening or passageway in the hook shank. However, the hooks disclosed by these patents involve a substantially different mode of operation than the snap hooks of the present invention.

It is an object of the present invention to provide a snap hook in which an initial pull on the release tether, accompanied by a release of tension in the hook line, will cause the snap hook to rotate in position to place an eye that is in the hook opening against the inner surface of the hook tine, so that a continuation of the pull on the release tether will first swing the snap finger into a hook throat opening position and then pull the hook away from engagement with the eye. Each of the snap hooks shown by the above three patents include structural features adapting it for a different mode of operation.

The following U.S. patents should also be considered for the purpose of putting the present invention into proper perspective with the prior art: U.S. Pat. No. 103,687, granted May 21, 1870 to Henry Thompson; U.S. Pat. No. 653,021, granted Jul. 3, 1900 to Charles S. Hamilton; U.S. Pat. No. 2,203,433, granted Jun. 4, 1940 to Nicolas U. Gundian; U.S. Pat. No. 2,313,802, granted Mar. 16, 1943 to Jonan F. Carlsen; U.S. Pat. No. 2,347,718, granted May 2, 1944 to Matson C. Terry; U.S. Pat. No. 2,432,125, granted Dec. 9, 1947 to Albert A. Schlaak; U.S. Pat. No. 2,432,342, granted Dec. 9, 1947 to Albert F. Shaner; U.S. Pat. No. 2,616,203, granted Nov. 4, 1952 to Joseph B. Sarakas; U.S. Pat. No. 2,633,333, granted Mar. 31, 1953 to Lynn W. Storm; U.S. Pat. No. 3,167,346, granted Jan. 26, 1965 to Marvin O. Miller; U.S. Pat. No. 3,193,318, granted Jul. 6, 1965 to William S. Guerrant, Jr.; and U.S. Pat. No. 3,653,101, granted Apr. 4, 1972 to Henry C. Mayo.

BRIEF DESCRIPTION OF THE DRAWINGS

Like numerals and letters are used to designate like parts throughout the several views of the drawing, and:

FIG. 1 is a top plan view of a snap hook shown engaging an eye at the bow of the boat, and showing a hook line in tension and a release tether in a slack condition;

FIG. 2 is a view like FIG. 1, but showing the release tether in tension and the hook line in a slack condition, such view showing the snap hook being rotated by the pull on the release tether, into a position placing the inner surface of the hook tine against a surface of the eye;

FIG. 3 is a view like FIGS. 1 and 2, but showing that a continuation of the pull on the release tether pulls the snap finger of the hook into a throat opening position, followed by a pulling of the hook away from the eye; and FIG. 4 is an exploded pictorial view of the snap hook with tether release, shown in FIGS. 1–3;

FIG. 5 is a cross sectional view taken substantially along line 5—5 of FIG. 4;

FIG. 6 is a fragmentary pictorial view of a second embodiment of snap hook;

FIG. 7 is a cross sectional view taken substantially along line 7—7 of FIG. 6;

FIG. 8 is a fragmentary pictorial view of a third embodiment of snap hook;

FIG. 9 is a cross sectional view taken substantially along line 9—9 of FIG. 8;

FIG. 10 is a pictorial view of a fourth embodiment of snap hook;

FIG. 11 is a cross sectional view taken substantially along line 11—11 of FIG. 10;

FIG. 12 is a pictorial view of a fifth embodiment of snap hook;

FIG. 13 is a cross sectional view taken substantially along line 13—13 of FIG. 12;

FIG. 14 is a view like FIG. 11 by showing a modified form of the release tether.

BEST MODE FOR CARRYING OUT THE INVENTION

Referring first to FIGS. 1–4, a snap hook H is shown attached to an I-ring E and a hook line L is shown connected to a hook eye HE. In the illustrated embodiment, the ring eye RE is a bow eye connected to the bow B of a boat. Ring eye RE can be connected to the bow B in any suitable manner. Ring eye RE includes an annular ring body 10 that defines an eye opening 12.

The snap hook H has a base end 14 which defines the hook eye HE. Hook eye HE includes a hook opening 16 which is engaged by a loop 18 at the end of the hook line L. Snap hook H includes a shank 20 that is connected to the base 14. Shank 20 extends from base 14 to a bight 22. Bight 22 extends from shank 20 to a tine 24. Tine 24 includes an inner surface 26 and a tine end 28. The base 14, the shank 20, the bight 22 and the tine 24 together define a hook opening 30. Base 14 includes a snap finger anchor 32. Snap finger anchor 32 and the tine end 28 together define a hook throat 34 (FIG. 3). Hook throat 34 provides an avenue into and out from hook opening 30.

A snap finger 36 is pivotally connected to the snap finger anchor 32, by a pivot pin 38. Snap finger 36 is normally biased into a hook throat closing position by a spring 40

(FIG. 5). Spring 40 allows snap finger 36 to be moved from the hook throat closing position into a hook throat opening position. A force supplied against snap finger 36 will swing it about the pivot established by pin 38, and move the outer end 42 of snap finger 36 away from tine end 28 (FIG. 3). Movement of snap finger 36 against the spring 40 compresses the spring 40 and stores in it spring energy which returns the snap finger 36 to a hook throat closing position upon a release of the force on snap finger 36.

Everything that has been described so far is conventional structure. In accordance with the intention, the snap hook H is provided with a strategically placed tether guide G and a release tether T having an end portion 44 that is strategically positioned on the snap finger 36. This results in a novel and strategic relationship between the tether guide G, the snap finger 36, the tether end portion 44 and the tine inner surface 26. The unique relationship of these features provides a mode of operation that is different from the mode of operation of known prior art snap hooks having a tether release.

According to the invention, a line extending from the tether guide G to the end 42 of snap finger 36 makes an angle with the inner surface 26 of tine 24 that is about thirty degrees to about 40 degrees. In preferred form, this angle is closer to about forty degrees. The tether end portion 44 connects to snap finger 36 and then extends over the end 42 of snap finger 36. Thus, the line of pull established by tether end portion 44 also makes an angle with the inner tine surface 26 that is about thirty degrees to about forty degrees. This angle is also preferably closer to about forty degrees. As will be described below, the portion of tether T outside of the tether guide G can take several different forms.

In the embodiment shown by FIGS. 1–3, tether end portion 44 is provided with a loop 46 outwardly of the tether guide G. Tether line 44 may be bent back on itself to form a loop with the end of the loop clamped to the start of the loop, as illustrated. A main tether line 48 may be secured to the loop 46. Or, as will be described below, the loop 46 may be grasped by a hook at the end of a pull.

Referring to FIG. 1, in this figure the snap hook H is connected to the bow eye RE. The hook bight 24 is within the eye opening 12. The eye body 10 is within the hook opening 30. The snap finger 36 is biased into a hook throat closing position by the spring 40. Hook line L is shown to be in tension and tether T is shown to be slack. In accordance with the present invention, the snap hook H is disconnected from the ring eye RE in the following manner. A pull is exerted on tether T, to put it into tension. At the same time, any tension in hook line L is released, allowing line L to become slack. The pull applied on tether T first rotates the snap hook H from the position shown in FIG. 1 into the position shown by FIG. 2. This is because of the strategic location of the tether guide G and the strategic connection of the tether portion 44 to the snap finger 42. Tension in tether T exerts a line of pull indicated by arrow PL. Tether portion 44 is moved generally against the side face of the ring eye RE that confronts the snap finger 36. This puts tether portion 44 in substantial parallelism with the side plane of the ring eye RE. It also moves the portion of ring eye that is within the hook opening 30 into a position between tether portion 44 and tine surface 26, and against the tine surface 26. In this position the tether portion 44 and the tine inner surface 26 are separated by an angle X which is between about thirty degrees and about forty degrees. As earlier stated, it is preferred that the angle X is closer to about forty degrees. As shown by FIG. 2, the portion ring eye RE that is in hook opening 30 has been moved away from the bight 22. An additional pull on the tether T, in the direction of pull line PL will first cause the snap finger 36 to swing into an open position. As snap finger 36 swings open, an open hook throat is defined between snap finger end 42, and tether portion 44 on one side of the hook throat, and the tine end 28 on the opposite side of the hook throat. As clearly shown by FIG. 3, when the hook throat 34 becomes sufficiently open, the ring eye RE slides relatively along tine inner surface 26 and relatively out through the hook throat 34. Actually, the ring eye RE is stationary and it is the hook H and the hook tine surface 26 which is moving. As can be seen by FIG. 3, once the ring eye RE is between the snap finger 36 and the tine end 36, any additional pull on the tether T will pull the hook H completely out of engagement with the ring eye RE.

Referring to FIGS. 6 and 7, the snap hook H shown by these figures include a modified construction of the tether guide G. As shown, a transverse opening 50 is formed in shank 20. A pin 52 is received within opening 50. Pin 52 includes a head 54 which is larger than the opening 50. The opposite end of pin 52 includes an end portion which projects outwardly beyond the side surface of the shank 20. A transverse opening is formed in this end surface. This opening forms the tether guide G. In use, this tether guide G assumes the position shown by FIG. 2, so that angle X is maintained between tether portion 44 and tine inner surface 26. Tether portion 44 extending through guide G also keep pin 52 located within opening 50.

The embodiment shown by FIGS. 8 and 9 includes a protuberance 58 formed on a side portion of shank 20. In this embodiment, the tether guide G is an opening formed in the protuberance 58. As in the earlier embodiments, this tether guide G is oriented to maintain the angle X between tether line portion 44 and tine inner surface 26 of about thirty degrees to about forty degrees, with about forty degrees being preferred.

FIGS. 10 and 11 disclose the preferred embodiment. In this embodiment, an opening 60 is formed at least part way through shank 22. Opening 60 is threaded to receive the threaded shank 62 of a machine screw 64. Machine screw 64 includes a head 66 in which a transverse opening has been formed. This opening forms the tether guide G. As in the other embodiments, this tether guide G is oriented to be in the position shown by FIG. 2. This guide G is located to define an angle X which is between about thirty degrees and about forty degrees and is preferably closer to about forty degrees.

FIGS. 12 and 13 shown an example of another way of providing the tether guide G. That is, a band or clamp is placed about the hook shank 22 and this band or shank 68 includes a through opening or passageway which provides the tether guide G. In the illustrated embodiment, clamp 68 is a standard hose clamp. It includes a band 70 which encircles the shank. One end of the band 70 is connected to a housing 72. The opposite end of the band 70 extends through the housing 72 and is engaged by a worm screw. Specifically, the worm screw engages spaced slot openings that are formed in the band 70. An adjustment screw 74 is located outside of housing 72 at one end of the worm screw. Rotation of adjustment screw 74 in the clockwise direction will pull the end portion 70' up and 70 through the housing 72. Housing 72 includes a passageway between it and the manned portion 70'. This passageway provides the tether guide G. As in the other embodiments, this tether guide G is positioned so as to establish an angle X (FIG. 2) that is between about thirty degrees and about forty degrees, with about forty degrees being preferred.

The release tether T may be formed by a single line which is connected to snap finger 36, and then extends to and through the tether guide G and then extends away from the snap hook H, to a position to be grasped by a user. In preferred form, the tether is a short line having the portion 44 and a loop 46 or grab ring GR (FIG. 14) located outboard of tether guide G. This loop 46 or grab ring GR is then grasped by an end portion of a boat hook which may be at one end of a long handle. An example of a standard boat hook is shown at 66 in U.S. Pat. No. 4,932,700, granted Jun. 12, 1990 to Ronald D. Hart.

As should be observed, the present invention was made to be incorporated into what is otherwise a standard snap hook H. Critical features of the invention are the location of the tether guide G, the extension of the release tether portion 44 over the end 42 of the snap finger 36, and the relationship of all parts which provides an angle X between the pull line PL and the inner surface 26 of the hook tine 24 that is between about thirty degrees and about forty degrees, with about forty degrees being the preferred angle. In other respects, the details of construction can vary. The scope of protection is not to be determined by the illustrated examples but rather by the claims which follow, construed in accordance with established rules of patent claims construction, including use of the doctrine of equivalents.

What is claimed is:

1. A snap hook with tether release, comprising:

a hook body including a base end, an elongated shank connected to and extending from the base end, a bight connected to and extending from said shank, and a tine connected to and extending from the bight and including a tine end, said tine, said bight and said shank together defining a hook opening, and said tine end and said base end together defining between them a hook throat, through which an eye may pass into and out from the hook opening;

a snap finger pivotally connected to said base end, and movable away from and towards the tine end, for opening and closing the hook throat;

a spring biasing said snap finger against the tine end, into a hook throat closing position, said snap finger being movable away from said tine end, against the spring, into a hook throat opening position;

wherein in use the hook is connected to a hook line at the base end, the hook bight engages an eye, a portion of which eye is located within the hook opening, and the snap finger is in its throat closing position, to prevent accidental disengagement of the hook from the eye;

a tether guide, said guide located by an angle of between thirty degrees and forty degrees formed between a line passing along an inner surface of said tine and a line passing through said tether guide and said tine end;

a release tether connected to said snap finger by first passing through an outwardly facing portion of said snap finger and fixed to said snap finger from an opposite side, and extending from the snap finger to and through said tether guide, and then away from said hook body; and wherein in use, with the hook body connected to a hook line at its base end, and engaging an eye at its bight, an initial pull on the tether, concurrent with a release of tension from the hook line, will cause the hook body to rotate into a position placing the tine against the eye, and a continuing pull on the tether will first pull the snap hook into its throat opening position and will then pull the hook body out of engagement with said eye.

2. A snap hook with tether release according to claim 1, wherein the hook shank includes a threaded opening, a threaded screw is received in said opening, said screw includes a head portion, and said tether guide is a transverse opening extending through said head portion of the screw.

3. A snap hook with tether release according to claim 1, wherein the tether guide is a tunnel opening extending through the hook shank.

4. A snap hook with tether release according to claim 1, wherein an opening extends through the hook shank, a pin extends through the opening, said pin includes a head on a first end that is larger than the opening, and an end portion at its opposite end which projects outwardly from such opening in the hook shank, and wherein said tether guide is a transverse opening extending through said end portion of the pin.

5. A snap hook with tether release according to claim 1, comprising a band encircling the hook shank, and wherein the tether guide is a passageway extending through a portion of said band.

6. A snap hook with tether release according to claim 1, wherein a side protrusion is formed integral with the hook shank, and said tether guide is a passageway extending through said side protrusion.

7. A snap hook with tether release according to claim 1, wherein said release tether includes a loop outwardly of the tether guide, and in use said loop is grabbed and pulled to pull the tether.

\* \* \* \* \*